United States Patent [19]
Dietrich et al.

[11] Patent Number: 6,143,389
[45] Date of Patent: *Nov. 7, 2000

[54] HEAT-INSULATING BODY

[75] Inventors: Karl Werner Dietrich, Odenthal; Heinz Thomas, Leichlingen, both of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,907

[22] PCT Filed: Oct. 26, 1995

[86] PCT No.: PCT/EP95/04218

§ 371 Date: Apr. 25, 1997

§ 102(e) Date: Apr. 25, 1997

[87] PCT Pub. No.: WO96/14538

PCT Pub. Date: May 17, 1996

[30] Foreign Application Priority Data

Nov. 4, 1994 [DE] Germany .............. 44 39 331
Mar. 24, 1995 [DE] Germany ............ 195 10 767

[51] Int. Cl.⁷ ..................... B32B 1/06
[52] U.S. Cl. ............... 428/69; 428/71; 428/76
[58] Field of Search .............. 428/68, 71, 69, 428/76; 52/309.4

[56] References Cited

U.S. PATENT DOCUMENTS

| | | | |
|---|---|---|---|
| 4,492,725 | 1/1985 | Ishihara et al. | 428/69 |
| 4,513,041 | 4/1985 | Delluc | 428/69 |
| 4,668,555 | 5/1987 | Uekado et al. | 428/69 |
| 5,273,801 | 12/1993 | Barry et al. | 428/69 |
| 5,603,887 | 2/1997 | Eschner | 264/333 |

FOREIGN PATENT DOCUMENTS

| | | |
|---|---|---|
| 2110394 | 10/1993 | Canada . |
| 4141524 | 5/1993 | Germany . |
| 4240854 | 6/1994 | Germany . |

Primary Examiner—Alexander S. Thomas
Attorney, Agent, or Firm—Joseph C. Gil; Noland J. Cheung

[57] ABSTRACT

The invention concerns a heat-insulating body comprising: a) a pulverized hard foamed plastics material and optionally an inorganic porous material; and b) a foil enveloping component a). The foil enveloping component a) is evacuated and then hermetically sealed.

8 Claims, No Drawings

HEAT-INSULATING BODY

BACKGROUND OF THE INVENTION

It is known that heat insulating bodies (vacuum panels) can be manufactured from a porous material and a gas-tight sheet which provides an all-round cladding, the "hollow space" formed by the porous material being evacuated. The porous material may consist either of an expanded bulk material, or of a rigid foamed material, however. The sheet usually consists of combinations of several layers, with different functions being performed by the different layers, such as a diffusion barrier to various gases and mechanical reinforcement.

Most commercially available vacuum panels have a core of inorganic bulk material, which is usually silicate-based.

EP-B-188 806 describes rigid foamed materials based on polyurethane (PUR) as a filler material for vacuum panels. The problem with this process is to achieve the requisite open cellularity by the precise selection of the formulation and by adhering to defined process parameters, since PUR rigid foamed materials are predominantly of closed cell structure. The outgassing of volatile constituents such as amines, foaming agents, and possibly monomers also, constitutes another problem when using PUR rigid foamed materials as a support material for vacuum panels.

On the other hand, one advantage of rigid PUR foamed materials compared with porous inorganic bulk materials is their accurate sizing as finished vacuum panels, as well as their dimensional stability.

Surprisingly, it has now been found that an excellent support material for vacuum panels can be produced in an economical manner by producing a porous bulk material by pulverising rigid foamed materials and processing this bulk material—similarly to porous silicate bulk materials—to form vacuum panels. In this connection rigid foamed materials are preferably used which arise in the recycling of valuable substances, and the PUR foamed material which arises on the recycling of refrigerators is particularly preferred in this respect.

SUMMARY OF THE INVENTION

The present invention thus relates to a heat insulating body consisting of
a) a rigid foamed plastic material comminuted to a powder and optionally an inorganic porous material, and of
b) a sheet which clads component a)
wherein the sheet which clads component a) has been evacuated and then hermetically sealed.

DETAILED DESCRIPTION OF THE INVENTION

According to the invention it is preferred that
the foamed plastic material to be comminuted is a polyurethane foamed material which preferably originates from the process of recycling old refrigerators,
the foamed plastic material powder has a particle size of 0.01 mm to 1 mm,
before being clad with the sheet, the foamed plastic material has been freed from volatile constituents by heating at temperatures from 50 to 250° C., preferably at 120 to 200° C., optionally under low pressure,
before being clad with the sheet, the foamed plastic material powder is pre-pressed at pressures from 0.5 to 5 bar, preferably 1 to 3 bar, and
a multilayer sheet, preferably a polyethylene/aluminium sheet or a polyethylene/polyvinyl alcohol sheet, is used as the cladding sheet,
porous silicates are used as the inorganic porous material.

All known sheets, e.g. combination sheets such as those which are also used in the production of commercially available vacuum panels, can be used for the vacuum panel produced according to the invention. The following may be cited as examples: a combination of polyethylene sheet with polyvinyl alcohol sheet or polyethylene sheet with aluminium sheet.

In principle, all rigid foamed plastic materials are suitable as foamed materials to be used according to the invention. Rigid polyurethane foamed materials are preferred. Even though the sheets used for vacuum panels are already highly impermeable to gases, nevertheless they do not constitute a gas or vapour barrier. In particular, water vapour which penetrates can have an adverse effect on the vacuum and thus on the heat insulating properties of the vacuum panel. In order to prevent this, vapour-absorbing substances, such as those based on silicate or alumina for example, can be used conjointly according to the invention in amounts from 10 to 90% by weight, preferably 20 to 50% by weight.

Comminution of the rigid foamed material can be effected according to the invention by milling, grinding or attrition; larger pieces of foamed material may also easily be crushed if necessary.

The fineness of the porosity can be adjusted according to the invention, firstly by the intensity of the milling process and secondly by the fineness of the cell structure of the foamed material to be pulverised.

Pre-pressing of the foamed material powder at pressures from 0.5 to 5 bar, preferably 1 to 3 bar, may be advantageous according to the invention, the pressed article then being processed later to form the vacuum panel.

Porous silicates are preferably used as the inorganic porous material which is optionally to be used according to the invention. The inorganic porous material is optionally used conjointly in an amount of 0.1 to 80% by weight, preferably 20 to 50% by weight, with respect to the rigid foamed plastic material which is comminuted to powder.

EXAMPLE OF APPLICATION 1000 g of PUR rigid foam powder—obtained from a dismantled old cooling appliance by pulverising the foamed material contained therein—was pre-pressed at 2.5 bar. The pressed article about 2 cm thick which was thus obtained was cut to the dimensions 40×40 cm after drying for 2 hours at 100° C. and subsequently clad with a sheet consisting of the layers:
polyethylene/polyvinyl alcohol/polyethylene.

The "bag" filled with PUR powder which was thus obtained was evacuated down to 0.001 bar. The edges of the sheet were welded under vacuum. The vacuum panel thus obtained had a thermal conduction coefficient $\lambda$ of 10 mW/°Km.

What is claimed is:
1. A heat insulating body comprising
   a) a rigid foamed plastic material comminuted to a powder and optionally an inorganic porous material, wherein said powder has a particle size of from 0.01 mm to 1 mm, and of
   b) a sheet which clads component a),
   wherein the foamed plastic material powder is pre-pressed at pressures of 0.5 to 5 bar and, prior to being clad with the sheet, has been freed from volatile constituents by heating at temperatures from 50 to 250° C. and, optionally, under a low pressure, and wherein the sheet which clads component a) has been evacuated and then hermetically sealed.

2. The heat-insulating body according to claim 1, wherein the foamed plastic material to be comminuted is a rigid polyurethane foamed material.

3. The heat-insulating body according to claim 1, wherein a multilayer sheet, is used as the cladding sheet.

4. The heat-insulating body according to claim 3, wherein said multilayer sheet is a polyethylene/aluminum sheet.

5. The heat-insulating body according to claim 3, wherein said multilayer sheet is a polyethylene/polyvinyl alcohol sheet.

6. The heat-insulating body according to claim 1, wherein porous silicates are used as the inorganic porous material.

7. The heat-insulating body according to claim 1, wherein said temperature ranges from 120 to 200° C.

8. The heat-insulating body according to claim 1, wherein said pressure ranges from 1 to 3 bar.

* * * * *